United States Patent
Nomoto et al.

(10) Patent No.: US 11,582,365 B2
(45) Date of Patent: Feb. 14, 2023

(54) INFORMATION PROCESSING SYSTEM THAT EXECUTES A PROCESS ON IMAGE DATA CORRESPONDNG TO A SELECTED PROFILE

(71) Applicant: CANON KABUSHIKI KAISHA, Tokyo (JP)

(72) Inventors: Masakazu Nomoto, Kanagawa (JP); Yu Tomioka, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/525,132

(22) Filed: Nov. 12, 2021

(65) Prior Publication Data

US 2022/0159145 A1    May 19, 2022

(30) Foreign Application Priority Data

Nov. 18, 2020   (JP) .............................. JP2020-191642

(51) Int. Cl.
| | |
|---|---|
| *H04N 1/44* | (2006.01) |
| *G06K 9/46* | (2006.01) |
| *H04N 1/00* | (2006.01) |
| *G06V 10/40* | (2022.01) |
| *G06V 30/10* | (2022.01) |

(52) U.S. Cl.
CPC .......... *H04N 1/4433* (2013.01); *G06V 10/40* (2022.01); *H04N 1/00244* (2013.01); *H04N 1/00344* (2013.01); *H04N 1/4426* (2013.01); *G06V 30/10* (2022.01)

(58) Field of Classification Search
None
See application file for complete search history.

(56) References Cited

U.S. PATENT DOCUMENTS

| | | | |
|---|---|---|---|
| 8,594,327 B2 | 11/2013 | Masui et al. | |
| 2004/0001226 A1* | 1/2004 | Ohtuka | H04N 1/00209 358/1.15 |
| 2008/0079985 A1 | 4/2008 | Ferlitsch | |
| 2015/0120857 A1* | 4/2015 | Nagai | H04L 67/01 709/219 |

FOREIGN PATENT DOCUMENTS

| | | |
|---|---|---|
| JP | 2007-060187 A | 3/2007 |
| JP | 2010-056770 A | 3/2010 |
| JP | 2017-062681 A | 3/2017 |

OTHER PUBLICATIONS

European Search Report dated Apr. 4, 2022, in related European Patent Application No. 21208015.

* cited by examiner

*Primary Examiner* — Andrew H Lam
(74) *Attorney, Agent, or Firm* — Venable LLP

(57) ABSTRACT

An information processing system includes an image processing apparatus capable of obtaining image data and a server-for-service connected with the image processing apparatus through a network. The server-for-service holds profile information, which defines processing executed on the image data uploaded from the image processing apparatus, in association with authorization information on a user. Thereafter, the server-for-service executes the processing in accordance with the profile information on the image data in response to a request from a terminal device or the image processing apparatus.

12 Claims, 19 Drawing Sheets

FIG.14

| JOB MANAGEMENT SCREEN | | | |
|---|---|---|---|
| TRANSMIT ~1710 | | PREVIEW ~1711 | |
| JOB NAME | TOTAL PAGE NUMBER | DATE | TRANSMISSION DESTINATION |
| AAAAA | 1 | 20XX/XX/XX | STORAGE 1 |
| BBBBB | 2 | 20XX/XX/YY | STORAGE 2 |
| CCCCC | 1 | 20XX/XX/ZZ | TRANSMIT EMAIL TO YOURSELF |
| BBBBB | 2 | 20XX/XX/YY | STORAGE 2 |

INFORMATION PROCESSING SYSTEM THAT EXECUTES A PROCESS ON IMAGE DATA CORRESPONDNG TO A SELECTED PROFILE

BACKGROUND OF THE INVENTION

Field of the Invention

The present invention relates to an information processing system and a storage medium.

Description of the Related Art

Some of devices having a scanner function to read an image and generate electronic data are connectable with a server that provides a predetermined service through a network.

Japanese Patent Laid-Open No. 2010-56770 discloses a network system that transmits image data obtained by the scanner function to a server of a storage service such that the server stores the image data therein. Additionally, Japanese Patent Laid-Open No. 2007-60187 discloses a system that attaches image data obtained by the scanner function to an e-mail to transmit the image data to another device.

SUMMARY OF THE INVENTION

In some cases, specific processing such as optical character recognition (OCR) may be required for image data obtained by the scanner function. However, in order to perform the above specific processing in a conventional network system, a user has needed to read data uploaded on a server and purposely perform the specific processing on the thus-read data.

The present invention is intended to solve the above-mentioned problem. Therefore, an object of the present invention is to allow for simple steps of using various services provided on a network onto image data that is obtained by a device connected to the network and uploaded on a server.

In a first aspect of the present invention, there is provided an information processing system including an image processing apparatus and a server system able to communicate with the image processing apparatus through a network, wherein the image processing apparatus outputs image data, and the server system comprises: a storage unit storing authorization information in association with a user; an authorization unit authorizing the image processing apparatus based on the authorization information; and a profile execution unit executing processing in accordance with profile information specified based on the authorization information onto image data outputted from the image processing apparatus in response to a request from a terminal device or the image processing apparatus that are authorized by the authorization unit.

In a second aspect of the present invention, there is provided a non-transitory computer-readable storage medium storing a program, wherein a server system used in an information processing system that includes an image processing apparatus and a server system able to communicate with the image processing apparatus through a network is functioned by the program as: a storage unit storing authorization information in association with a user; an authorization unit authorizing the image processing apparatus based on the authorization information; and a profile execution unit executing processing in accordance with profile information specified based on the authorization information onto image data outputted from the image processing apparatus in response to a request from a terminal device or the image processing apparatus authorized by the authorization unit.

Further features of the present invention will become apparent from the following description of exemplary embodiments with reference to the attached drawings.

BRIEF DESCRIPTION OF THE DRAWINGS

FIG. 14 is a diagram illustrating a job management screen of the management function;

DESCRIPTION OF THE EMBODIMENTS

<Configuration of Information Processing System>

Figure 1:
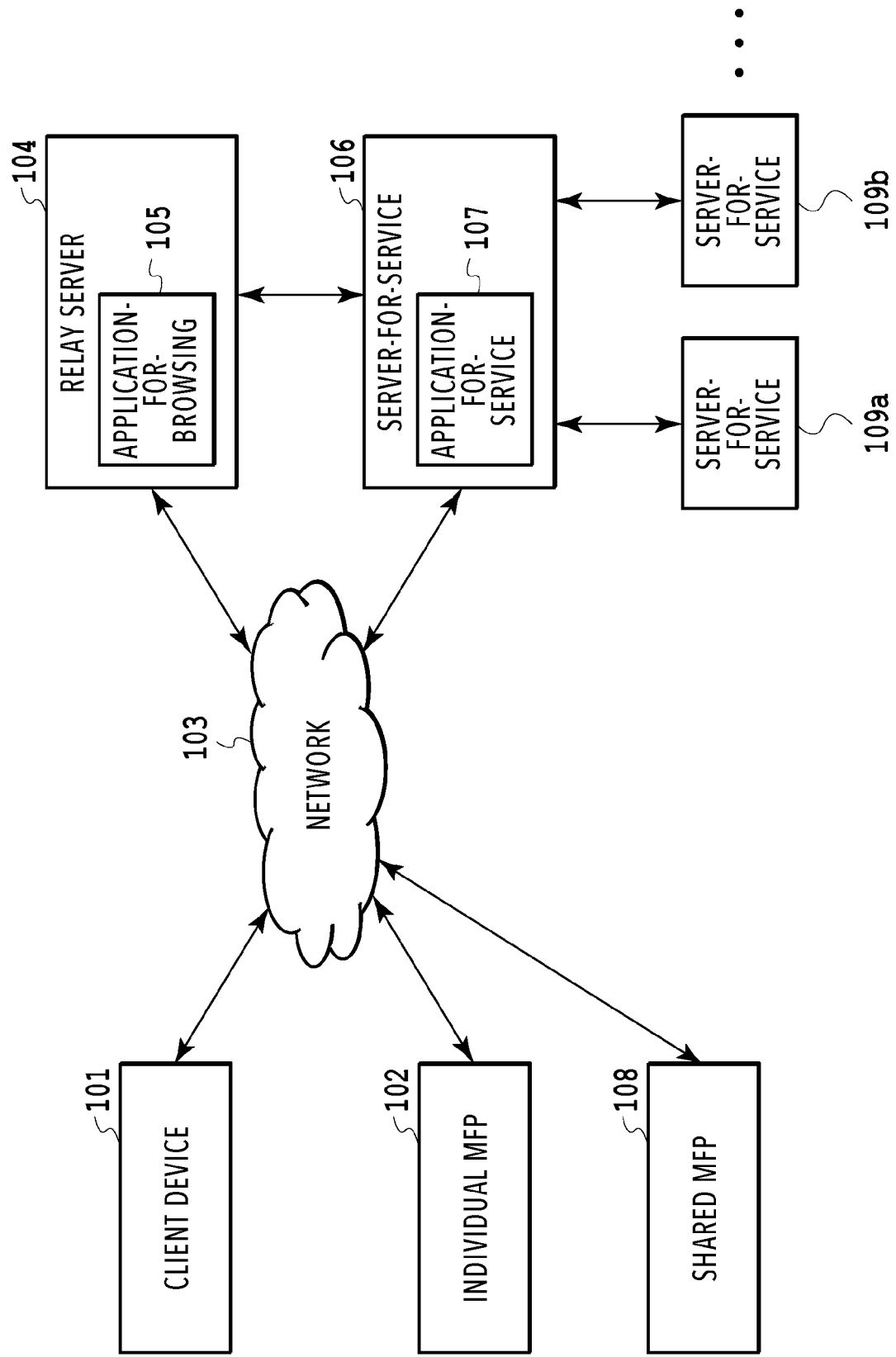
FIG. 1 is a diagram describing a configuration of an information processing system.

FIG. 1 is a diagram describing a configuration of an information processing system usable in this embodiment. The information processing system in this embodiment includes a network 103, a client device 101 connected to the network 103, an individual MFP 102, a shared MFP 108, a relay server 104, and a server-for-service 106. An MFP herein is a so-called multifunction printer (multifunction peripheral: hereinafter, also referred to as MFP) and is an image processing apparatus having a scanning function and a printing function.

As the network 103, a local area network (LAN), a wide area network (WAN), a telephone line, and a dedicated digital line may be used, for example. An asynchronous transfer mode (ATM), a Frame Relay line, a cable television line, a wireless line for data broadcasting, and the like may also be used. The network 103 may be in the form of a so-called communication network such as the Internet implemented by a combination of the above-mentioned various lines.

As the client device 101, a smartphone, a tablet, a general-purpose personal computer, and the like may be used. The individual multifunction peripheral (MFP) 102 is an MFP for home use that is premised on being used by one or few people. The shared MFP 108 is an MFP with relatively high performance and high functionality that is installed in an office or a public facility. The client device 101, the individual MFP 102, and the shared MFP 108 are connected to the Internet through an access point.

In this embodiment, a web browser is installed in each of the client device 101 and the individual MFP 102, such that the client device 101 and the individual MFP 102 can use various web services on the browser through a browsing service provided by an application-for-browsing 105 of the relay server 104. That is, the client device 101 and the individual MFP 102 are capable of indirectly using a service provided by an application-for-service 107 through the relay server 104. Therefore, even in a case where a function of the server-for-service 106 is updated, the client device 101 and the individual MFP 102 are capable of using the new function of the server-for-service 106 without performing an operation of changing an application. Additionally, since the individual MFP 102 can charge the relay server 104 with a part of image processing, it is possible to reduce the load on a CPU 205 and the usage of a working memory 207 (see FIG. 2).

On the other hand, the shared MFP 108 is capable of directly using a service provided by the application-for-service 107 without the relay server 104.

The relay server 104 provides the application-for-browsing 105 implemented therein in response to an access from the client device 101 and the individual MFP 102 and manages a screen for browsing a web page in the corresponding terminal device. That is, users of the client device 101 and the individual MFP 102 can use a service provided by the server-for-service 106 in accordance with contents displayed on the browser screen. This web page includes a service login page to login the server-for-service 106, and the like.

In the server-for-service 106, the application 107 providing a predetermined service to various terminal devices that are able to communicate through a network is implemented. Hereinafter, the "application providing a predetermined service" is referred to as an "application-for-service". The service provided by the application-for-service 107 may include a service of managing image data and a document file owned by a user by the server-for-service 106 and enabling browsing of the data and file, for example. There may also be included a service of performing processing such as OCR on image data provided from a user and additionally performing business form processing on the data after OCR, and the like. Moreover, the application-for-service 107 is also capable of providing a service of providing and updating file information through an application programming interface (API). The above services are merely examples, and the application-for-service 107 is capable of providing various publicly-known services. A user can use such services through a web browser and another graphical user interface (GUI).

The server-for-service 106 may provide a service by itself; however, as illustrated in FIG. 1, the server-for-service 106 may be connected with one or more other servers-for-service 109a, 109b . . . and provide services provided from these connected servers together. In any case, with various application-for-services being usable through a network like the information processing system in FIG. 1, it is possible to reduce the processing load on the individual MFP 102 and the shared MFP 108 and to provide the individual MFP 102 and the shared MFP 108 at low prices. In FIG. 1, an example in which the relay server 104 includes one server (information processing apparatus) is described; however, the relay server 104 may include multiple servers. That is, a function may be executed by multiple servers cooperatively operating. Likewise, the server-for-service 106 may include multiple servers. In the present disclosure, a configuration including one or more servers is referred to as a server system.

In a case where users of the client device 101, the individual MFP 102, and the shared MFP 108 use the application-for-service 107, the users need to login by using account information that is registered in advance. In this embodiment, login means that various terminal devices input account information on them into the server-for-service 106, the server-for-service 106 authorizes the account information and the various terminal devices obtain the authorization information. As the login, generally-known open authorization (OAuth) can be used. As a method of the login, a personal identification number (PIN) code issued by the application-for-service 107 may be inputted from the various terminal devices.

Figure 2:
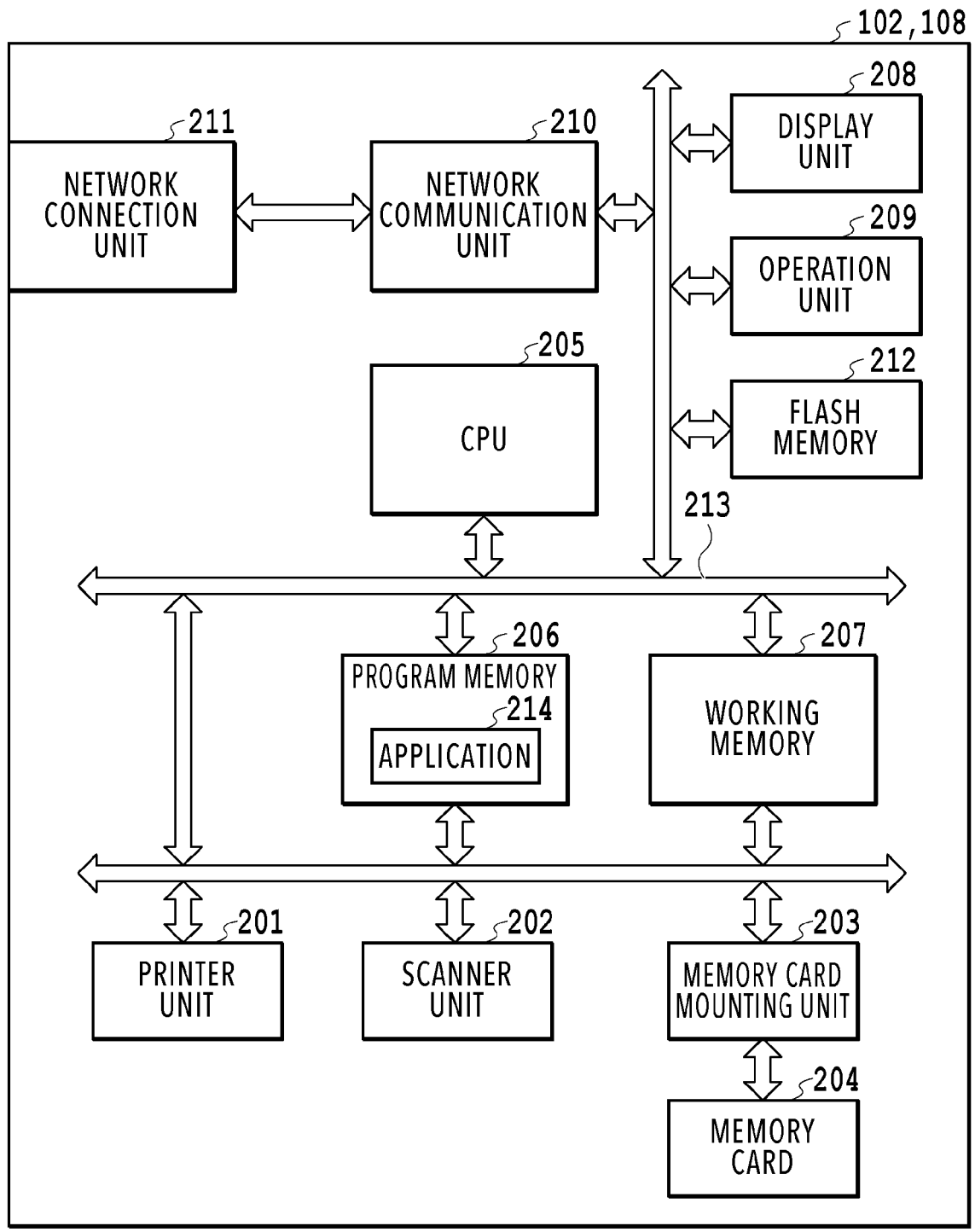
FIG. 2 is a control configuration diagram of an individual MFP and a shared MFP.

FIG. 2 is a block diagram describing a control configuration of the individual MFP 102 and the shared MFP 108. The CPU 205 as a central processing unit controls the overall device while using the working memory 207 as a work area in accordance with a program stored in a program memory 206. The program memory 206 includes a ROM and the like and stores not only various program codes but also parameters required to operate a printer unit 201 and a scanner unit 202, an application 214 for communicating with a server device, and the like. The application 214 can also access the printer unit 201 to obtain information on consumables such as ink and paper. The working memory 207 includes a RAM and the like and is used in a case where the CPU 205 performs predetermined image processing, for example. The working memory 207 is also used to temporarily save and buffer image data during execution of each service.

The printer unit 201 prints an image on not-illustrated paper in accordance with image data received from outside or image data stored in a memory card 204. The printing method is not particularly limited, and an ink jet method, an electrophotographic method, and the like can be employed. The printer unit 201 also manages information on consumables such as color materials and paper.

The scanner unit 202 optically reads an original copy set on a not-illustrated platen glass and converts the obtained electronic data into image data in a designated file format.

The memory card 204 is demountably mounted in a memory card mounting unit 203. The CPU 205 can read various data saved in the memory card 204 and can save various data into the memory card 204.

A network communication unit 210 controls a network connection through a network connection unit 211 under control of the CPU 205. The network communication unit 210 may be compatible with a wired LAN or may be compatible with a wireless LAN. In a case of a wired LAN, a connector that connects a cable of the wired LAN is the network connection unit 211. In a case of a wireless LAN, an antenna is the network connection unit 211.

A flash memory 212 is a non-volatile memory that stores image data received by the network communication unit 210. A display unit 208 includes an LCD, for example, and displays various pieces of information to a user. An operation unit 209 includes a switch group and the like and accepts an input of a command and information from a user. A bus 213 connects the above-described mechanisms with each other.

Under the above-described configuration, the CPU 205 can cause the printer unit 201 to print an image based on the image data received from a network or the image data read from the memory card 204. Additionally, the CPU 205 can cause the scanner unit 202 to perform scanner processing and can cause the printer unit 201 to print an image in accordance with the obtained image data. Moreover, the CPU 205 can save the image data obtained from the scanner processing into the memory card 204 and can transmit the image data through the network communication unit 210.

Figure 3:
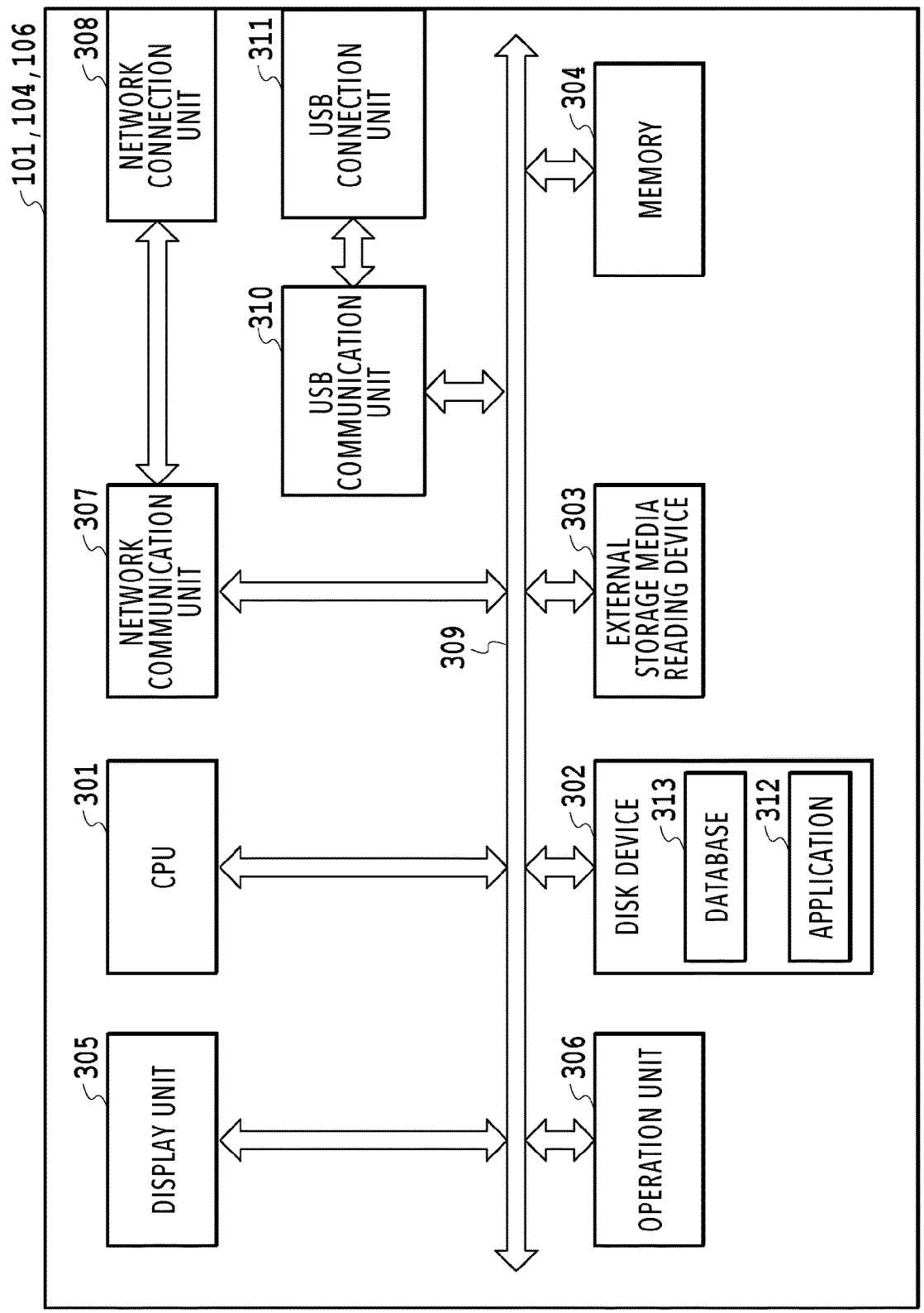
FIG. 3 is a control configuration diagram of a client device, a relay server, and a server-for-service.

FIG. 3 is a schematic block diagram describing a control configuration of the client device 101, the relay server 104, and the server-for-service 106. A CPU 301 as a central processing unit controls the overall device while using a memory 304 as a work area in accordance with a program saved in a disk device 302. The disk device 302 stores not only an application 312 read by the CPU 301 but also a database 313, an OS, and various files. The memory 304 includes a RAM and the like and is used by the CPU 301 to temporarily save and buffer data and the like.

A network communication unit 307 controls a network connection through a network connection unit 308 under control of the CPU 301. The network communication unit 307 may be compatible with a wired LAN or may be compatible with a wireless LAN. In a case of a wired LAN, a connector that connects a cable of the wired LAN is the network connection unit 308. In a case of a wireless LAN, an antenna is the network connection unit 308. Under control of the CPU 301, a USB communication unit 310 controls communication with an externally connected peripheral device through a USB connection unit 311.

An external storage media reading device 303 is a device reading file information and the like stored in an external storage medium such as an SD card. A display unit 305 includes an LCD, for example, and displays various pieces of information to a user. An operation unit 306 includes a keyboard, a mouse, and the like and accepts an input of a command and information from a user. In the client device 101, the display unit 305 and the operation unit 306 may be a touch panel in which their functions are integrated. A bus 309 connects the above-described mechanisms with each other.

The client device 101, the relay server 104, and the server-for-service 106 may be virtual computers implemented on another computer.

<Specific Example of Using Application-for-Service>

Figure 4:
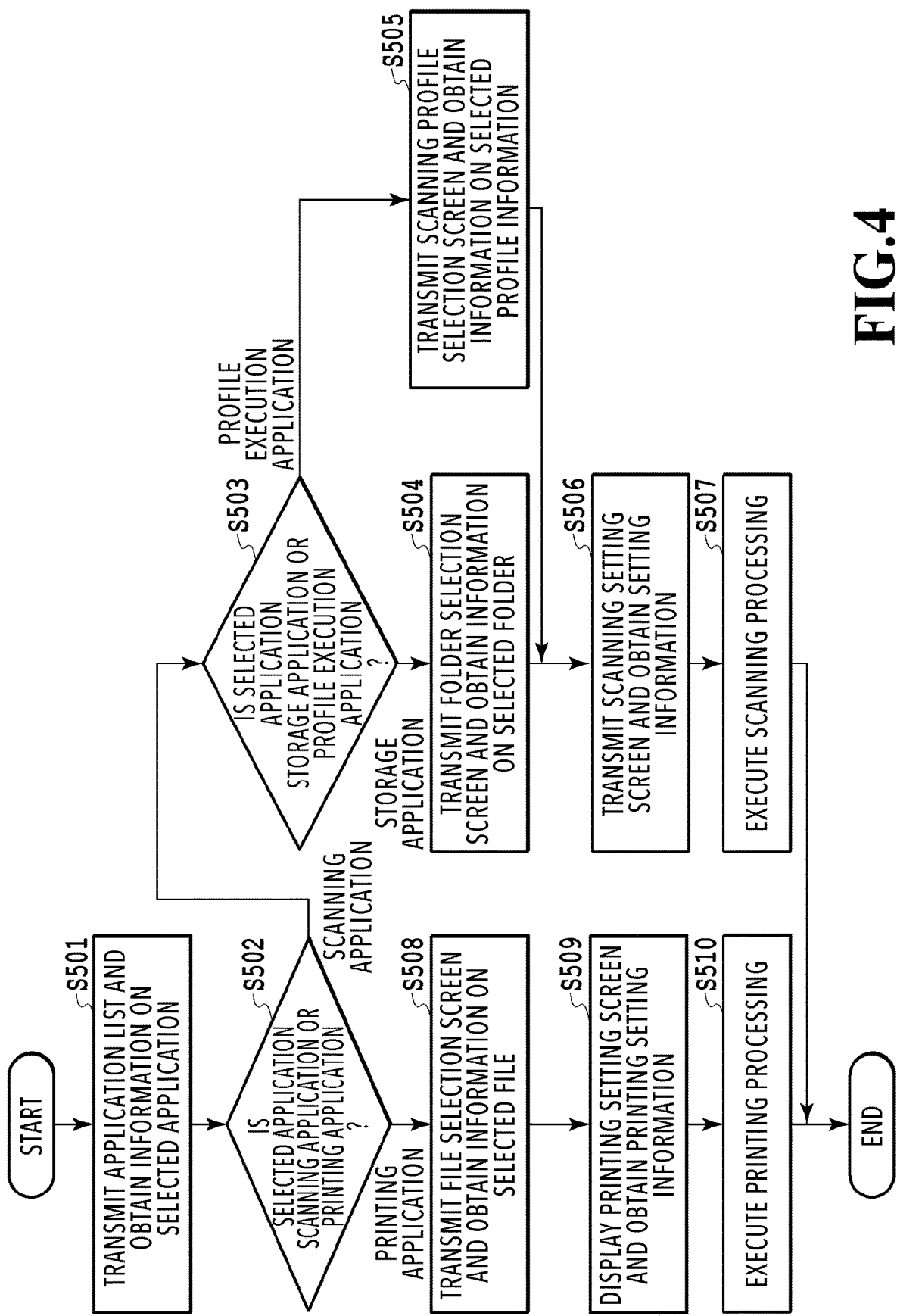
FIG. 4 is a flowchart describing processing executed by the relay server.

Next, a specific example of using an application-for-service is described. FIG. 4 is a flowchart describing processing executed by the relay server 104 in a case where a user uses the application-for-service 107 of the server-for-service 106 by means of the individual MFP 102. This processing is executed with the CPU 301 of the relay server 104 activating the application 312 of the disk device 302. This processing is started with the user accessing the application-for-browsing 105 of the relay server 104 on a web browser of the client device 101 or the individual MFP 102. Here, a case where the user accesses the application-for-browsing 105 from the individual MFP 102 is described as an example; however, similar steps are performed also in a case of accessing from the client device 101.

When this processing is started, in S501, the relay server 104 first transmits a list of services usable in the individual MFP 102 to the individual MFP 102. Accordingly, the list of the usable services is displayed on the display unit 208 of the individual MFP 102.

Figure 5:
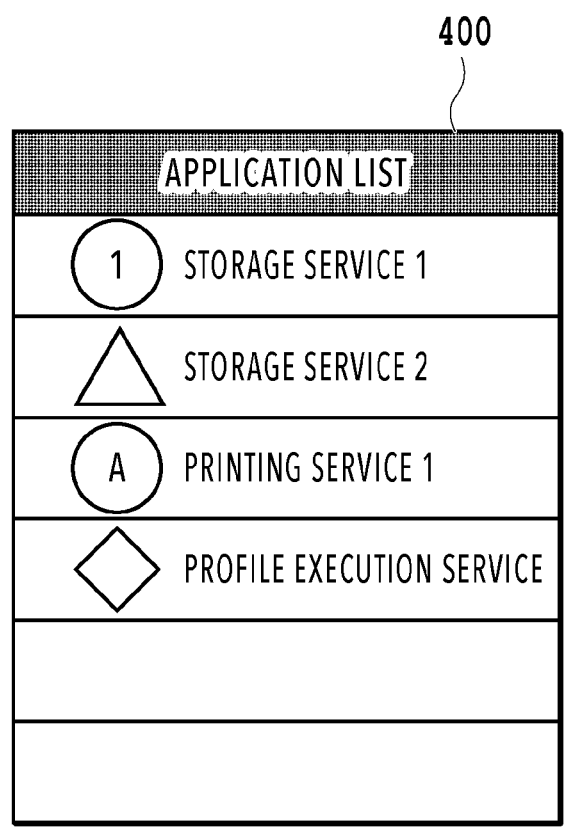
FIG. 5 is a diagram illustrating a list of services displayed on the individual MFP.

FIG. 5 is a diagram illustrating the list of the services displayed on the display unit 208 of the individual MFP 102. In FIG. 5, an application list 400 displays four menus as options, which are "storage service 1", "storage service 2", "print service 1", and "profile execution service". These services may be provided by the server-for-service 106 or may be provided by the other servers-for-service 109a, 109b ... connected to the server-for-service 106 (see FIG. 1).

In FIG. 5, the "storage service 1" and the "storage service 2" are services of saving and managing the image data read by the scanner unit 202 in their corresponding servers. The "print service 1" is a service of providing an image to be printed by the printer unit 201 from the server-for-service 106. The "profile execution service" is a service of performing specific processing on the image data obtained by the individual MFP 102, including the scanning processing by the scanner unit 202. The user selects a desired service, or an application to be executed, from these multiple services. Accordingly, information on the selected application is transmitted from the individual MFP 102 to the relay server 104, and thus the relay server 104 can obtain the information.

FIG. 5 illustrates a case where the terminal device in use is an MFP, that is, a case where the terminal device in use is a device having a printer function. However, if the terminal device in use is a device having no printer function such as a simple scanner device or a camera, for example, a service that can never be implemented like the "print service 1" is preferably not displayed.

Back to the description of FIG. 4. In a case where the information on the application to be executed is obtained in S501, the relay server 104 proceeds to S502 and determines whether the set application is a scanning application or a printing application. If the set application has both the functions of printing and scanning, the relay server 104 may further transmit a screen in which either of printing or scanning can be selected so as to allow the user to select one.

In S502, in a case where it is determined that the set application is a scanning application, the relay server 104 proceeds to S503 and determines whether the set application is a storage application or a profile execution application. The storage application herein means an application that provides a service of saving the image data obtained from the scanning processing by the scanner unit 202 into a predetermined server. On the other hand, the profile execution application means an application that performs specific processing such as OCR on the image data obtained from the scanning processing by the scanner unit 202.

In a case where it is determined that the set application is a storage application, the relay server 104 proceeds to S504. The relay server 104 then transmits a screen for selecting a folder for saving that is managed by the server-for-service 106 to the individual MFP 102 and obtains setting information on the folder for saving from the individual MFP 102.

Figure 6:
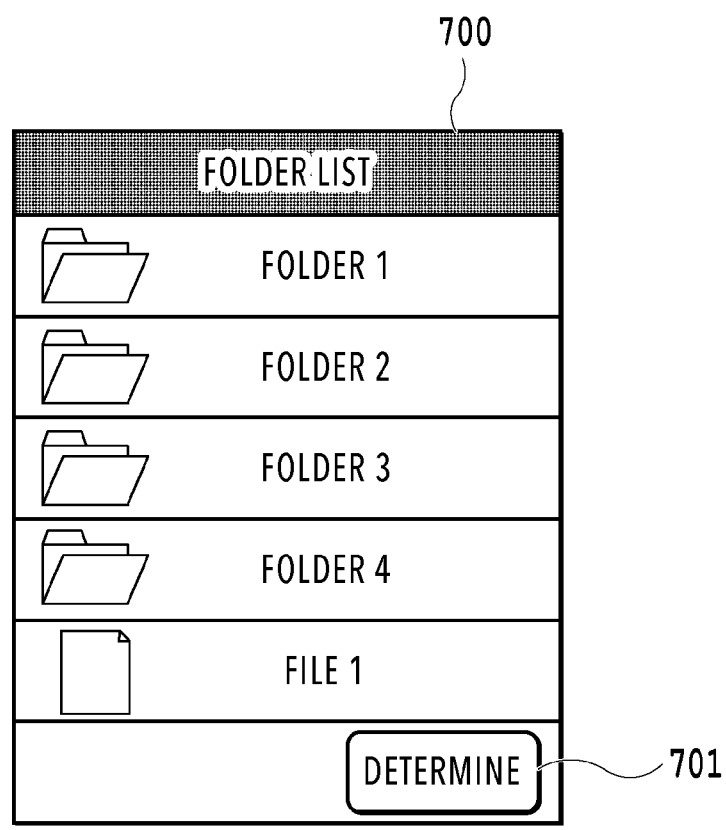
FIG. 6 is a diagram illustrating an example of a folder selection screen displayed on the individual MFP.

FIG. 6 is a diagram illustrating an example of the folder selection screen displayed on the display unit 208 of the individual MFP 102 in S504. In FIG. 6, a folder list screen 700 displays a list of subfolders, which are capable of saving image data therein, in a folder focused within a folder hierarchy. To be specific, first, the highest hierarchy within the folder hierarchy is displayed. In this case, a file 1 represents a file that is saved in advance in the same hierarchy as folders 1 to 4. When the user selects any one of the above-mentioned multiple folders, the display of the folder list screen 700 is updated so as to display a subfolder and a file in the selected folder. In the scanning application, the file 1 can never be selected since the user is instructed to select a destination file for saving; therefore, the file 1 may not be displayed on the folder list 700. When the user selects a determination button 701, a parent folder of the hierarchy that is being displayed in that moment is selected as a folder into which the image data should be saved.

Back to the description of FIG. 4. In a case where it is determined that the set application is a profile execution application in S503, the relay server 104 proceeds to S505. The relay server 104 then transmits a screen for selecting a profile managed by the server-for-service 106 to the individual MFP 102 and obtains information on the profile to be executed from the individual MFP 102.

Figure 7:
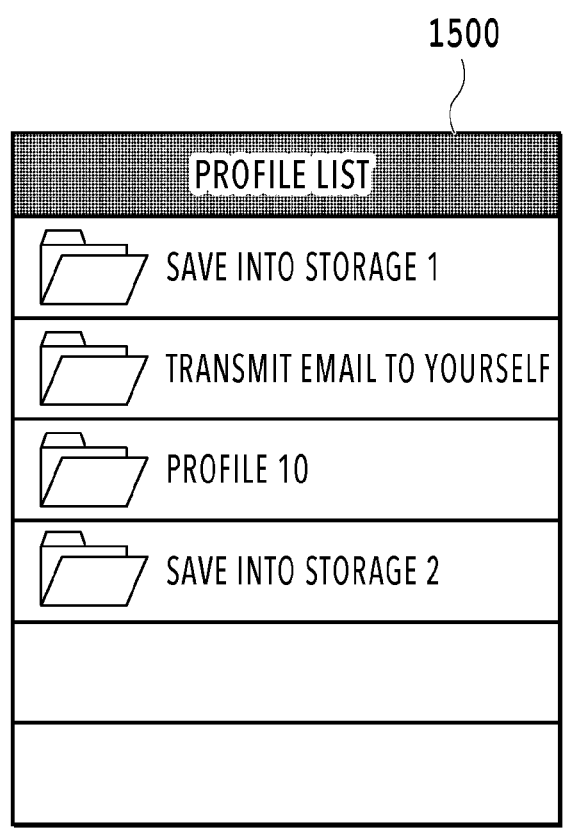
FIG. 7 is a diagram illustrating an example of a profile selection screen displayed on the individual MFP.

FIG. 7 is a diagram illustrating an example of the profile selection screen displayed on the display unit 208 of the individual MFP 102 in S505. In FIG. 7, a profile list 1500 displays a list of profiles registered by the user in advance in the server-for-service 106. The user selects a desired profile from these multiple profiles.

In FIG. 7, only the profile names are listed; however, information on each profile such as created date and time and information on someone who created may be appended. Additionally, out of the registered profiles, only a profile that is executable in the individual MFP 102 may be displayed, or the registered profiles may be displayed in the descending order of use frequency. Such a display control may be performed by the relay server 104 or may be performed by the individual MFP 102.

Back to the description of FIG. 4. In S506, the relay server 104 transmits a scanning setting screen obtained from the server-for-service 106 to the individual MFP 102 and obtains scanning setting information set by the user.

Figure 8:
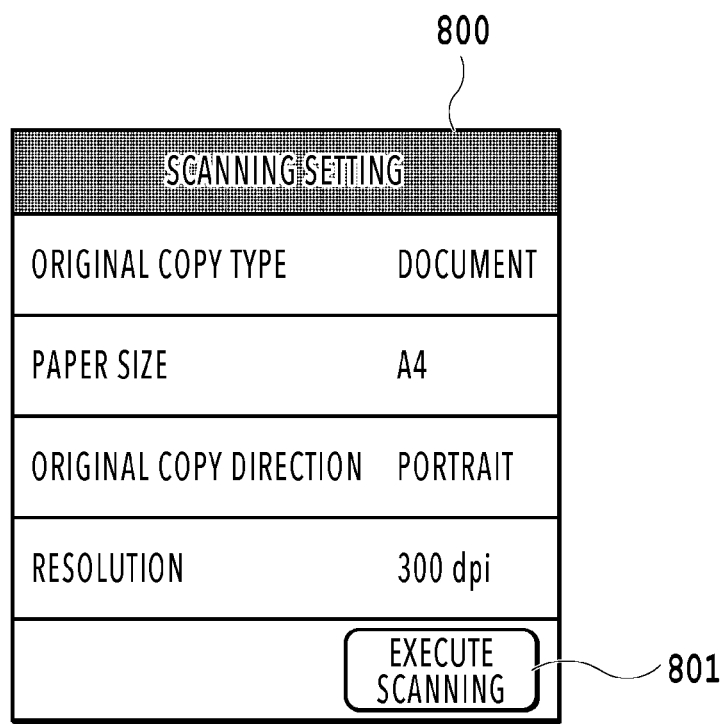
FIG. 8 is a diagram illustrating an example of a scanning setting screen displayed on the individual MFP.

FIG. 8 is a diagram illustrating an example of the scanning setting screen displayed on the display unit 208 by the individual MFP 102 in S506. In this example, "original copy type", "paper size", "original copy direction", and "resolution" are settable items in a case where the scanning processing is performed by the scanner unit 202. After setting each of these items, the user selects a scanning execution button 801. Accordingly, the information set by the user is transmitted to the relay server 104 by the individual MFP 102. Here, the four types of items are exemplified; however, the number and the contents of the setting items can be changed depending on the function of the individual MFP 102. Also, a configuration in which some of or all the items are set to a fixed value so as not to accept the selection by the user may be employed.

Back to the description of FIG. 4. In a case where the scanning setting information is obtained in S506, the relay server 104 proceeds to S507 and executes the scanning processing. To be specific, the relay server 104 transmits a scanning instruction based on the scanning setting information set in S506 to the individual MFP 102 so as to cause the individual MFP 102 to perform the scanning processing and obtains the thus-obtained image data.

In this process, in a case where it is determined that a storage application is selected in S503, the relay server 104 transmits the image data obtained from the scanning processing to the server-for-service 106 with the folder setting information obtained in S504. Once receiving them, the server-for-service 106 saves the uploaded image into the set folder. On the other hand, in a case where it is determined that a profile execution application is selected in S503, the relay server 104 transmits the image data obtained from the scanning processing to the server-for-service 106 with the profile information obtained in S505. Once receiving them, the server-for-service 106 executes predetermined processing on the uploaded image based on the profile information.

In a case where it is determined that the set application is a printing application in S502, the relay server 104 proceeds to S508. The relay server 104 then transmits a screen for selecting a file managed by the server-for-service 106 to the individual MFP 102 and obtains information on an image file to be printed from the individual MFP 102. The file selection screen may be a display screen as illustrated in FIG. 6. The user may select the determination button 701 after selecting a folder in which the image file to be printed is saved out of the multiple folders and further selecting the image file to be printed. In the printing application, as long as an image file is specified at least, the determination button 701 may not be displayed, and therefore an image file may be determined as the printing target once the file is selected.

In S509, the relay server 104 transmits the printing setting screen obtained from the server-for-service 106 to the individual MFP 102 and obtains printing setting information set by the user. The user performs setting to perform the print processing by the printer unit 201 through the printing setting screen displayed on the display unit 208 of the individual MFP 102. The details of the printing setting screen are not described; however, note that, the user can instruct starting of the print processing after setting "paper type", "paper size", "number of copies", "image processing", and the like on the printing setting screen.

In S510, the relay server 104 obtains the image file set in S508 from the server-for-service 106 and executes the printing processing. To be specific, the relay server 104 performs image processing on the obtained image file based on the printing setting information obtained in S509 and transmits the image file to the individual MFP 102. Accordingly, the CPU 205 of the individual MFP 102 causes the printer unit 201 to print an image in accordance with the received image data. Here, the image processing based on the printing setting information obtained in S509 is performed by the relay server 104; however, such image processing may be executed by the individual MFP 102. Also, the image processing may be performed by a cooperation of the relay server 104 and the individual MFP 102. Then, this processing is terminated.

In FIG. 4, a case where the user uses a service related to the individual MFP 102 is described; however, if the terminal device in use has no printer function, the relay server 104 may not perform the steps of S502 and S508 to S510. That is, after receiving the information on an application to be executed in S501, the relay server 104 may proceeds directly to S503.

Additionally, in FIG. 4, the processing performed by a relay server in a case where the individual MFP 102 uses the application-for-service 107 of the server-for-service 106 is described; however, similar processing is performed also in a case where no relay server is required like a case where the shared MFP 108 uses the application-for-service 107 of the server-for-service 106. In this case, note that, the series of processing described in FIG. 4 is performed by the server-for-service 106.

Details of transmission and reception actually performed between the individual MFP 102, the relay server 104, and the server-for-service 106 in some of the steps described in FIG. 4 are further described below.

<Step of Designating Folder of Server-for-Service>

Figure 9:
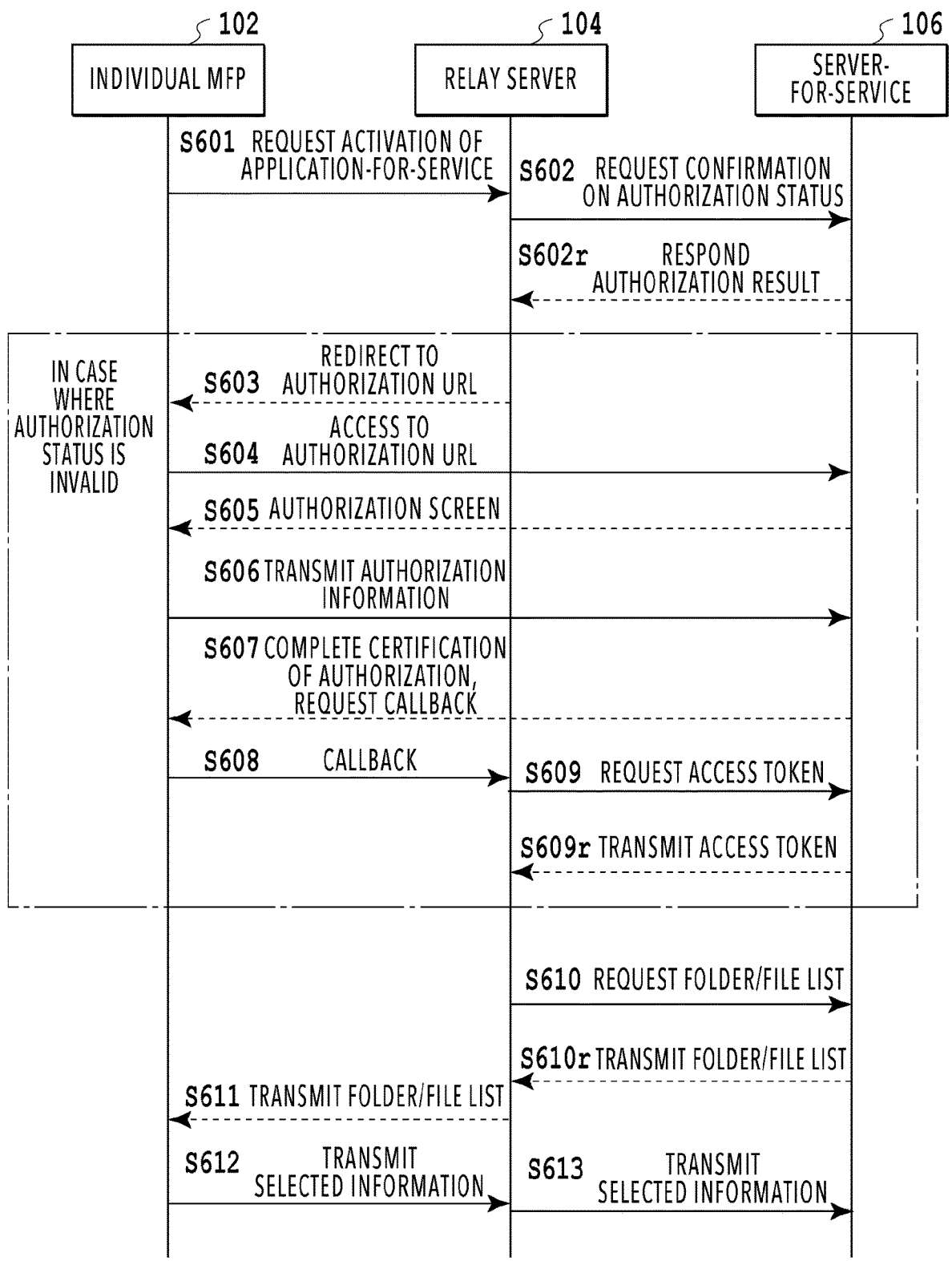
FIG. 9 is a diagram indicating steps performed to designate a folder of the server-for-service.

FIG. 9 is a diagram describing the steps of transmission and reception performed between the individual MFP 102, the relay server 104, and the server-for-service 106 in order to designate a folder or a file of the server-for-service 106 in S504 or S508 in FIG. 4. The step executed by the individual MFP 102 is performed with the CPU 205 of the individual MFP 102 operating the application 214 held by the program memory 206 to control each unit (see FIG. 2). The step executed by the relay server 104 and the server-for-service 106 is performed with the CPU 301 of each of the relay server 104 and the server-for-service 106 controlling each unit based on the program saved in the disk device 302 (see FIG. 3).

Here, a case where the user uses the application-for-browsing 105 of the relay server 104 through the individual MFP 102 is described as an example; however, the processing is performed in similar steps also in a case where the user uses the client device 101. In this embodiment, in a case where the processing of designating a folder or a file is performed, authorization of the user and approval of the access to the server-for-service 106 are performed before the processing. Here, generally known OAuth is described as an example. In OAuth, the relay server 104 takes a role as a client, while the server-for-service 106 takes a role as a resource server.

Once the user selects a desired application from the screen displayed on the individual MFP 102 in S501 in FIG. 4, the individual MFP 102 requests the relay server 104 to activate a corresponding application-for-service (S601). At the request of the individual MFP 102, the relay server 104 requests the server-for-service 106 to confirm the authorization status of the individual MFP 102 (S602). At the request of the relay server 104, the server-for-service 106 confirms the authorization status and responds an authorization result indicating whether the service onto the individual MFP 102 is valid or invalid to the relay server 104 (S602r).

If the authorization result received by the relay server 104 is "valid", steps from S603 to S609r are skipped. On the other hand, if the authorization result received by the relay server 104 is "invalid", the relay server 104 requests the individual MFP 102 to be redirected to an URL for authorizing the server-for-service 106 (S603). Here, the case where the authorization result is invalid is comparable to a case where the individual MFP 102 accesses the server-for-service 106 for the first time, or a case where the validity of the last authorization information is expired.

The individual MFP 102 that receives the request of being redirected directly accesses the authorization URL of the server-for-service 106 (S604). The authorization URL that accepts the access transmits an authorization screen to be displayed on the individual MFP 102 (S605).

In accordance with the displayed authorization screen, the user inputs information required for the authorization such as an account ID and a password by using the operation unit 209 of the individual MFP 102. The individual MFP 102 transmits the inputted authorization information to the authorization URL of the server-for-service 106 (S606). In this process, if the authorization processing cannot be completed because of a failure in the user operation and the like, the steps of S605 and S606 are repeated between the server-for-service 106 and the individual MFP 102. If the individual MFP 102 is in the form that cannot display the authorization screen, the steps of authorization and approval from S605 to S607 may be performed by another terminal device such as the client device 101.

Once the received authorization information is certified, the server-for-service 106 requests the individual MFP 102 to transmit a callback after completing the authorization (S607).

The individual MFP 102 that receives the request of transmitting a callback transmits callback information to the relay server 104 (S608). The relay server 104 that receives the callback information requests the server-for-service 106 to transmit an access token for obtaining a folder/file list of the authorized account based on the received callback information (S609). The server-for-service 106 that receives the request transmits the access token to the relay server 104 (S609r).

The relay server 104 that receives the access token uses the received access token to request the server-for-service 106 to transmit the folder/file list associated with the authorized account (S610). The server-for-service 106 that receives the request transmits the corresponding folder/file list to the relay server 104 (S610r). The relay server 104 transmits the received folder/file list to the individual MFP 102 (S611). As the folder/file list received by the individual MFP 102 is displayed as illustrated in FIG. 6, the user of the individual MFP 102 can confirm the folder and the file managed by the server-for-service 106.

Once the user selects an arbitrary folder or file, the individual MFP 102 transmits information on the selected folder to the relay server 104 (S612). The relay server 104 that receives the folder information transmits the folder information to the server-for-service 106 (S613).

In a case where the folder selected by the user has multiple hierarchies, the steps from S610 to S613 are repeated until a specific saving space is determined, and the display on the folder list 700 may be updated every time the steps are repeated.

<Step of Saving Scanned Data into Storage Server>

Figure 10:
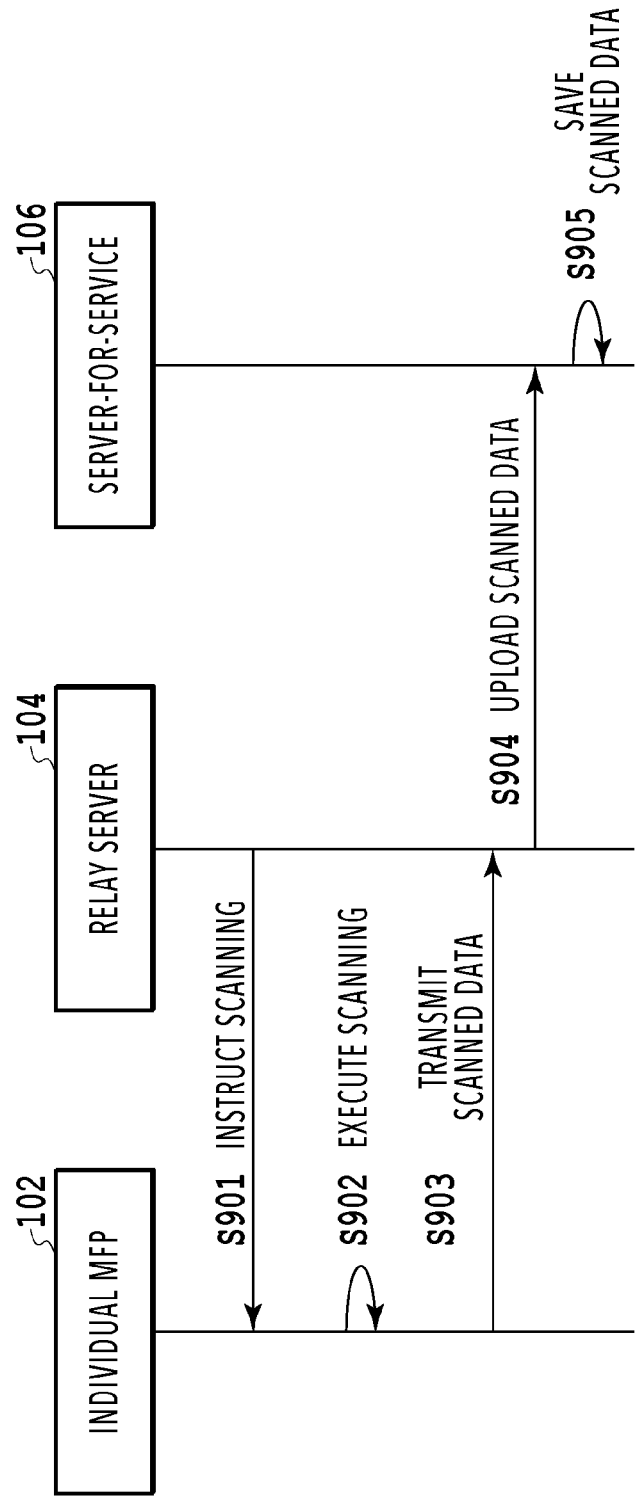
FIG. 10 is a diagram indicating steps of saving scanned data into a storage server.

FIG. 10 is a diagram describing in detail the steps of transmission and reception performed between the individual MFP 102, the relay server 104, and the server-for-service 106 in the scanning processing in S507 in FIG. 4 in a case where the set scanning application is a storage application. The step executed by the individual MFP 102 is performed with the CPU 205 of the individual MFP 102 operating the application 214 held by the program memory 206 to control each unit (see FIG. 2). The step executed by the server-for-service 106 is performed with the CPU 301 of the server-for-service 106 controlling each unit based on the program saved in the disk device 302 (see FIG. 3).

Once the scanning setting information based on the setting screen in FIG. 8 is obtained, the relay server 104 transmits the scanning instruction based on the set scanning setting information to the individual MFP 102 (S901). The individual MFP 102 that receives the scanning instruction uses the scanner unit 202 and executes the scanning processing in accordance with the instructed setting (S902). Next, the individual MFP 102 transmits the scanned data (image data) obtained from the scanning processing in S902 to the relay server 104 (S903). The relay server 104 that receives the scanned data uploads binary data of the received scanned data to the server-for-service 106 with the information on the folder for saving that is obtained in S504 in FIG. 4 (S904). In this process, the access token obtained in S609r in FIG. 9 is used to select a storage server associated with the account. The server-for-service 106 that receives the instruction saves the received scanned data into the designated folder (S905).

<Management Function of Profile Execute Service>

Here, a management function provided from the profile execution service to the client device 101 is described. In this embodiment, the management function is a service of managing a user using a terminal device having no scanning function such as the client device 101 and an MFP having the scanning function such as the individual MFP 102 and the shared MFP 108 by associating the user and the MFP with each other.

Figure 11:
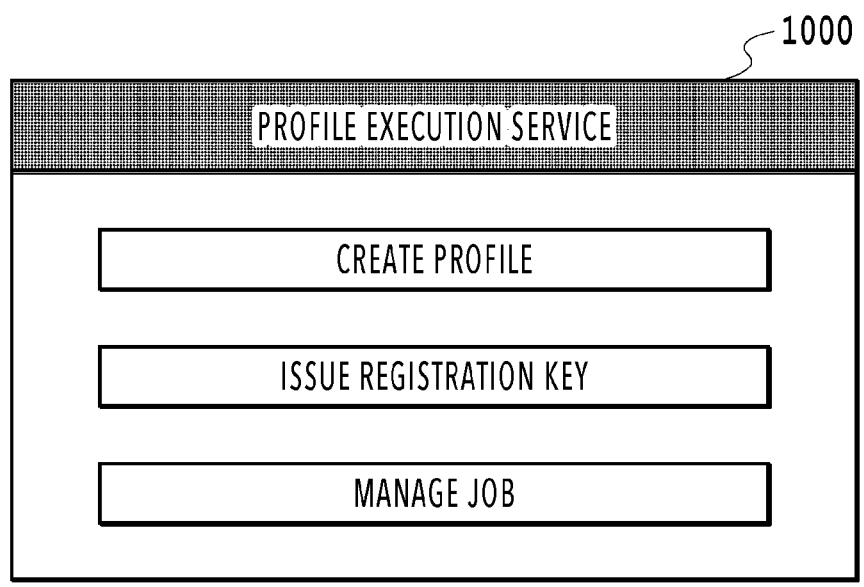
FIG. 11 is a diagram illustrating a menu screen displayed in a case where a management function is activated.

FIG. 11 is a diagram illustrating an example of a menu screen displayed on the client device 101 in a case where the management function of the profile execution service is activated. Such a menu screen 1000 is provided with the user directly accessing the application-for-service 107 of the server-for-service 106 from a web browser of the client device 101 and is displayed through the web browser. The menu screen 1000 includes buttons of "profile creation", "registration key issue", and "job management", and the user can select a desired item from the buttons.

Figure 12:
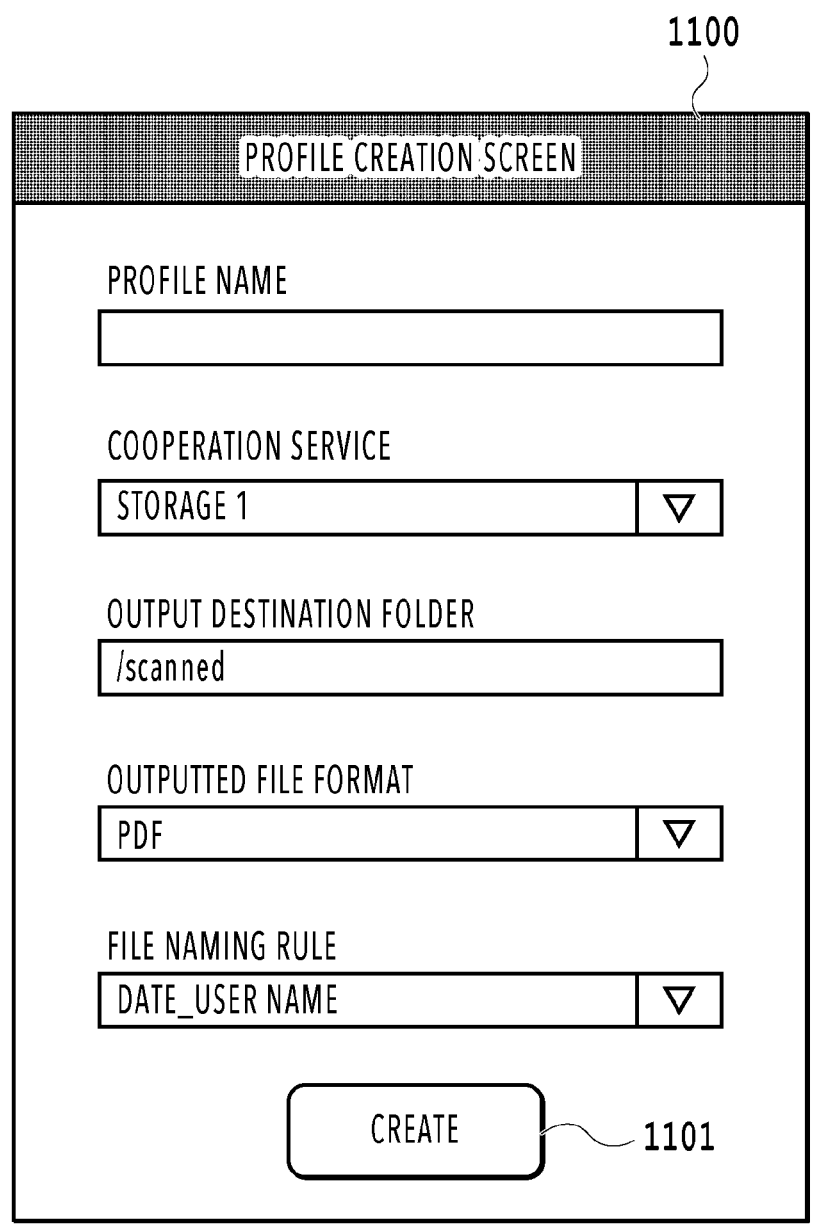
FIG. 12 is a diagram illustrating a profile creation screen of the management function.

FIG. 12 is a diagram illustrating a profile creation screen displayed through the web browser in a case where the user selects the "profile creation" on the menu screen 1000 in FIG. 11. A profile creation screen 1100 is a screen on which the details of the processing to be performed on the scanned data obtained from the scanning processing are defined as a profile. On the profile creation screen 1100, the user inputs or selects a desired content into or from each item and thereafter selects a creation button 1101.

In FIG. 12, in "profile name", the user can input a desired name as the name of the target profile. The inputted profile name is registered by the server-for-service 106 and is displayed as one of the options on a profile list screen described later.

In "cooperation service", the user designates a service of executing a target profile. Such a cooperation service may be provided by a server different from the server-for-service 106 such as the servers-for-service 109a, 109b . . . described in FIG. 1. If the scanned data is desired to be saved in a storage service, the user designates a storage service as a saving destination. If the scanned data is desired to be transmitted by an e-mail, the user designates an e-mail transmission service. If OCR is desired to be performed on the scanned data and also the data is desired to be saved, or if OCR is desired to be performed on the scanned data and also the business form processing is desired to be performed on the OCR result, a service of performing the two types of processing together is designated.

FIG. 12 illustrates a case where "storage 1" is selected as a storage service as a saving destination in order to save the scanned data into a storage service. Accordingly, setting items related to the storage service are displayed below the "cooperation service".

In "output destination folder", the user designates a folder into which the scanned data is saved. In "outputted file format", the user sets a file format for saving the scanned data. In "file naming rule", the user selects a format of a file name in a file storage into which the scanned data is saved out of some formats defined in advance. A method of inputting each item may be a method in which a text box is arranged and the user inputs letters therein like the "profile name" and the "output destination folder", or may be a method in which a combo box is displayed and the user selects one from multiple fields like the other items. After the input or selection of these items, the user selects the creation button 1101, and thus the contents set on the profile creation screen are transmitted to the server-for-service 106.

The server-for-service 106 defines one profile based on the received set contents and saves the profile in association with the user account.

If a service different from the storage service is selected in the "cooperation service", a setting item related to the selected service may be displayed below the "cooperation service". The service different from the storage service may include an OCR service, for example. In the OCR service, a part of a character string obtained from the OCR may be set as a default name of the file or may be automatically set as a file name. As described above, the user can define various profiles by using the profile creation screen illustrated in FIG. 12.

Figure 13:
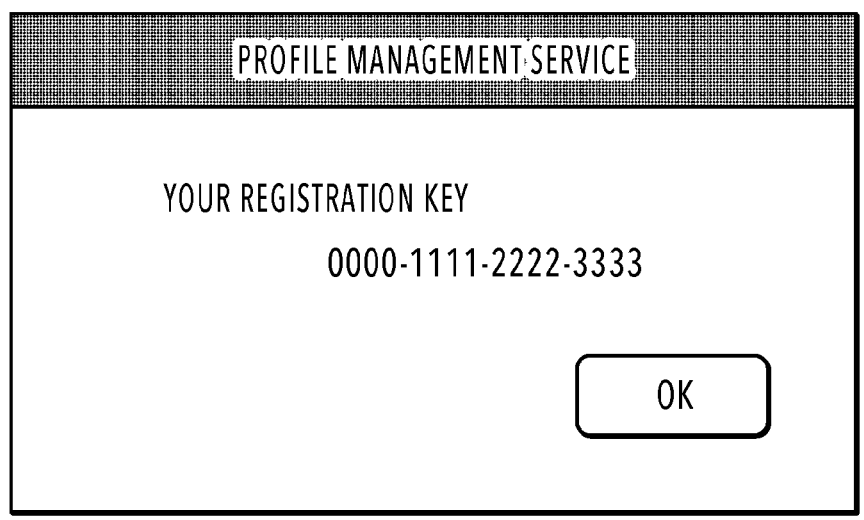
FIG. 13 is a diagram illustrating a registration key issue screen of the management function.

FIG. 13 is a diagram illustrating a registration key issue screen displayed through a web browser in a case where the user selects the "registration key issue" on the menu screen in FIG. 11. Once the user selects the "registration key issue", the server-for-service 106 issues a registration key in association with the user account. The issued registration key is saved into the server-for-service 106 and thereafter used as needed by the user in a case where the profile execution service is used. The registration key in this embodiment includes a value of random 16 digits and is displayed on the screen while being divided by four digits to improve the visibility by the user. The registration key may be provided with a validity that is, for example, 30 minutes after issue.

FIG. 14 is a diagram illustrating a job management screen displayed through a web browser in a case where the user selects the "job management" on the menu screen in FIG. 11. In this case, multiple jobs registered in the server-for-service 106 are listed and displayed. In this case, "job name", "total page number", "date", and "transmission destination" are displayed as items related to each jobs.

The "job name" indicates a name assigned by the server-for-service 106 during the job registration. The "total page number" indicates the number of pages of the scanned data obtained by the server-for-service 106 during the job registration. The "date" indicates a date on which the job is registered. The "transmission destination" displays a service name as a transmission destination to which the server-for-service 106 transmits the scanned data during processing of the job. This service name is comparable to the service name that is designated in the "cooperation service" on the profile creation screen described in FIG. 12. The items displayed on the job list are not limited to the above and can be changed as necessary.

Out of these multiple jobs, the user can select a job to be executed. In this case, a situation in which a job with a job name of "BBBBB" is selected is illustrated. When the user selects a preview button 1711 while an arbitrary job is selected, an image of scanned data corresponding to the selected job is displayed on the display unit 305 of the client device 101. That is, the user can confirm the correspondence between the selected job and the image. On the other hand, when the user selects a transmission button 1710 while an arbitrary job is selected, the job is transmitted to a corresponding profile execution service, and processing is executed with the service of the transmission destination.

<Step of Designating Profile for Profile Execution Service>

Figure 15:
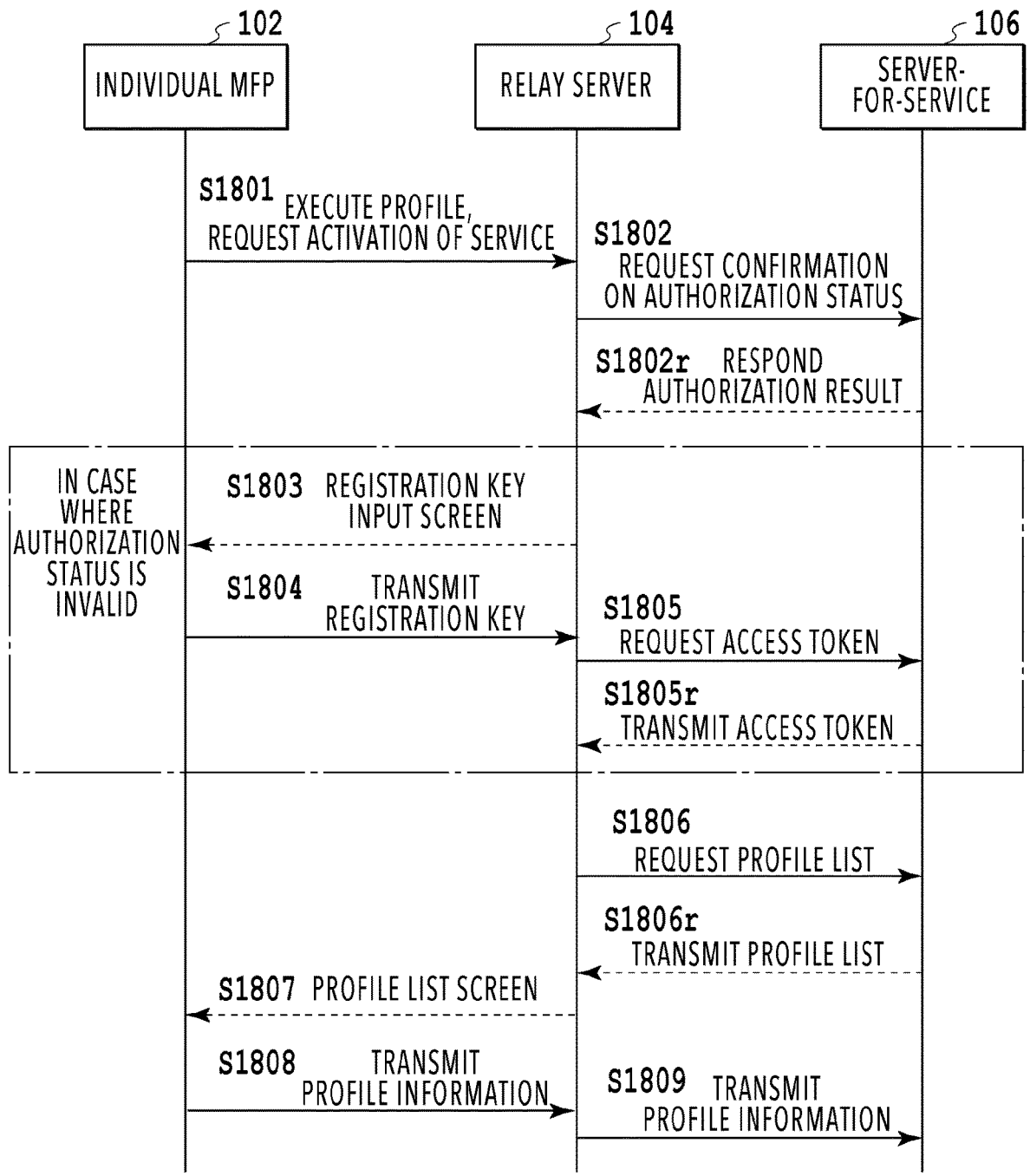
FIG. 15 is a diagram indicating steps of designating a profile for the storage server.

FIG. 15 is a diagram describing in detail the steps of transmission and reception performed between the individual MFP 102, the relay server 104, and the server-for-service 106 in a case where a desired profile is designated in S505 in FIG. 4. The step executed by the individual MFP 102 is performed with the CPU 205 of the individual MFP 102 operating the application 214 held by the program memory 206 to control each unit (see FIG. 2). The step executed by the relay server 104 and the server-for-service 106 is performed with the CPU 301 of each of the relay server 104 and the server-for-service 106 controlling each unit based on the program saved in the disk device 302 (see FIG. 3). Here, a case where the user uses the application-for-browsing 105 of the relay server 104 through the individual MFP 102 is described as an example; however, the processing is performed in similar steps also in a case where the user uses the client device 101.

In S501 in FIG. 4, if the user selects the profile execution service from the application list 400 in FIG. 5 displayed on the individual MFP 102, the individual MFP 102 requests the relay server 104 to activate a corresponding application-for-service (S1801). At the request of the individual MFP 102, the relay server 104 requests the server-for-service 106 to confirm the authorization status of the individual MFP 102 (S1802). At the request of the relay server 104, the server-for-service 106 confirms the authorization status and responds an authorization result indicating whether the service onto the individual MFP 102 is valid or invalid to the relay server 104 (S1802r).

If the authorization result received by the relay server 104 is "valid", steps from S1803 to S1805r are skipped. On the other hand, if the authorization result received by the relay server 104 is "invalid", the relay server 104 transmits a registration key input screen to the individual MFP 102 (S1803). Here, the case where the authorization result is "invalid" is comparable to a case where the individual MFP 102 accesses the server-for-service 106 for the first time, or a case where the validity of the authorization information obtained last time is expired. The individual MFP 102 that receives the registration key input screen displays the screen on the display unit 208.

Figure 16:
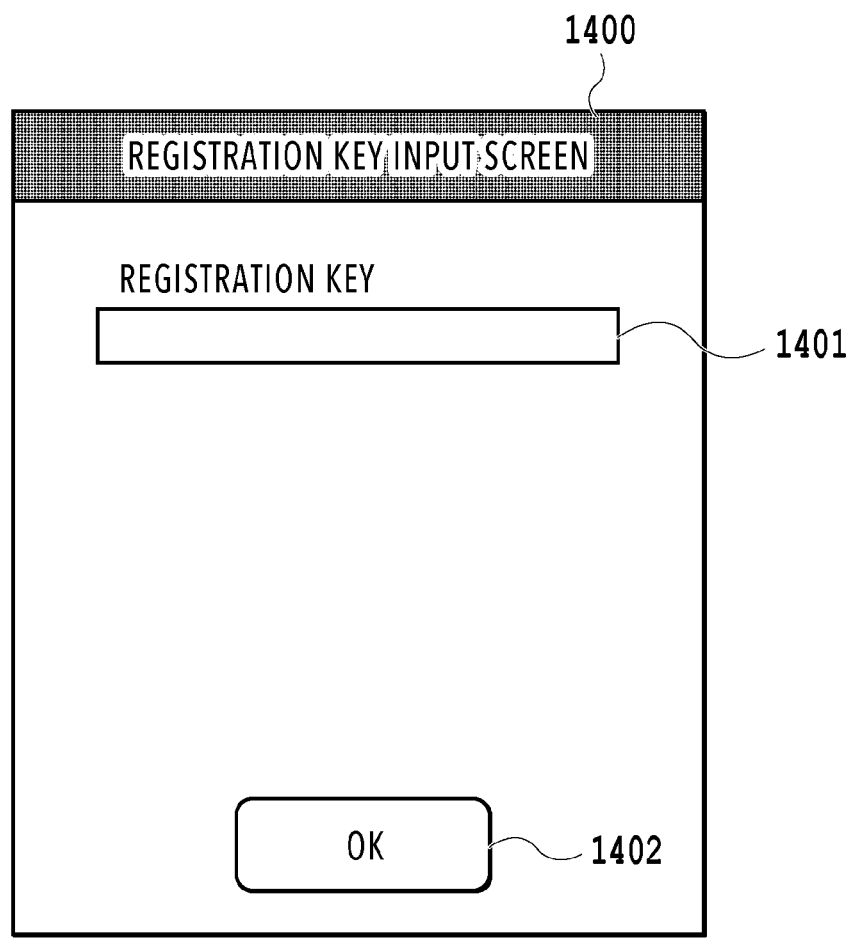
FIG. 16 is a diagram illustrating a registration key input screen.

FIG. 16 is a diagram illustrating a registration key input screen 1400. The user who confirms the registration key input screen 1400 inputs a registration key into an entry box 1401 and selects an OK button 1402. In this case, in the entry box 1401 of the registration key, hyphens may be added every four digits to improve the visibility by the user. This registration key is comparable to the registration key described in FIG. 13 that is obtained in advance by the user of the client device 101 using own account.

Back to the description of FIG. 15. The individual MFP 102 transmits information on the inputted registration key to the relay server 104 (S1804). The relay server 104 uses the received registration key to request the server-for-service 106 to transmit an access token for obtaining a profile list of the server-for-service 106 associated with the registration key (S1805). The server-for-service 106 that receives the request transmits the access token to the relay server 104 (S1805r).

The relay server 104 that receives the access token uses the received access token to request the server-for-service 106 to transmit the profile list associated with the registration key (S1806). The server-for-service 106 that receives the request transmits the corresponding profile list to the relay server 104 (S1806r). The relay server 104 transmits a screen on which the received profile list is listed to the individual MFP 102 (S1807). The individual MFP 102 displays the received profile list on the display unit 208 as illustrated in FIG. 7. Consequently, the user of the individual MFP 102 can confirm the profile list managed by the server-for-service 106.

Once the user selects an arbitrary profile, the individual MFP 102 transmits information on the selected profile to the relay server 104 (S1808). The relay server 104 that receives the profile information transmits the profile information to the server-for-service 106 (S1809).

Here, in the description, the authorization of the user account in the server-for-service 106 is performed by using a registration key; however, the authorization of the user account may be performed by the login processing in an OAuth system as with the case of FIG. 9.

<Step of Causing Storage Server to Execute Profile>

Figure 17:
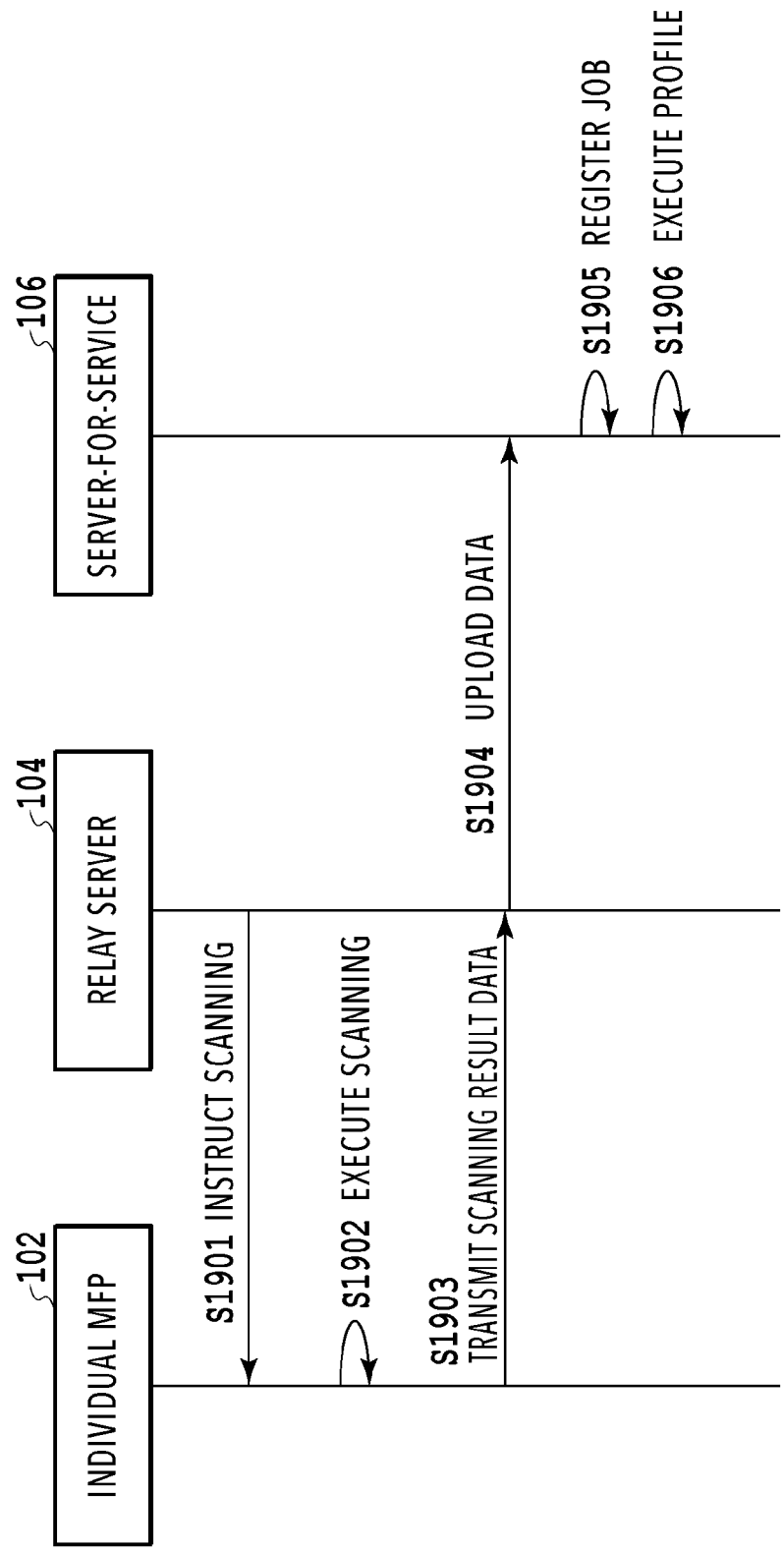
FIG. 17 is a diagram indicating steps of causing the storage server to execute a profile.

FIG. 17 is a diagram describing in detail the steps of transmission and reception performed between the individual MFP 102, the relay server 104, and the server-for-service 106 in the scanning processing in S507 in FIG. 4 in a case where the set scanning application is a profile execution application. The step executed by the individual MFP 102 is performed with the CPU 205 of the individual MFP 102 operating the application 214 held by the program memory 206 to control each unit (see FIG. 2). The step executed by the relay server 104 and the server-for-service 106 is performed with the CPU 301 of each of the relay server 104 and the server-for-service 106 controlling each unit based on the program saved in the disk device 302 (see FIG. 3).

Once the scanning setting information based on the setting screen in FIG. 8 is obtained, the relay server 104 transmits a scanning instruction based on the set scanning setting information to the individual MFP 102 (S1901). The individual MFP 102 that receives the scanning instruction uses the scanner unit 202 to execute the scanning processing in accordance with the instructed setting (S1902). Thereafter, the individual MFP 102 transmits the scanned data obtained from the scanning processing in S1902 to the relay server 104 (S1903). The relay server 104 that receives the scanned data uploads binary data of the received scanned data to the server-for-service 106 with the profile selection information selected from the profile list in FIG. 7 (S1904). In this process, the access token obtained in S1805r in FIG. 15 is used to select the application-for-service 107 associated with the account.

The server-for-service 106 registers a pair of the received scanned data and the profile selection information as one job in association with the user account (S1905). Then, processing on the scanned data in accordance with the profile is performed (S1906). The processing in accordance with the profile may be performed later in a timing in which the user instructs the execution of the job on the job management screen described in FIG. 14.

Note that, in the description, the scanned data is transmitted from the relay server 104 to the server-for-service 106 in the above-described S1904; however, the scanned data may be requested from the server-for-service 106 to the relay server 104. The procedure in this case is simply described below.

Once the scanned data is received from the individual MFP 102, the relay server 104 temporarily saves this data into own storage service. The relay server 104 then generates a URL that allows for an access to the saved data and notifies the server-for-service 106 of this URL. The server-for-service 106 may use the received URL to access the storage service of the relay server 104 and obtain the scanned data.

In this process, the profile selection information may be transmitted from the relay server 104 to the server-for-service 106 with the URL or may be transmitted in a different timing. The relay server 104 may save the profile selection information into own storage service with the scanned data and transmit the URL for access to the serverfor-service 106. Also, the scanned data and the profile selection information may be saved together into the storage service.

<Step of Designating Profile from Shared MFP>

Next, a case where the user uses the shared MFP 108 to use the application-for-service 107 of the server-for-service 106 is described. The shared MFP 108 can directly use the service provided by the application-for-service 107 without the relay server 104.

Figure 18:
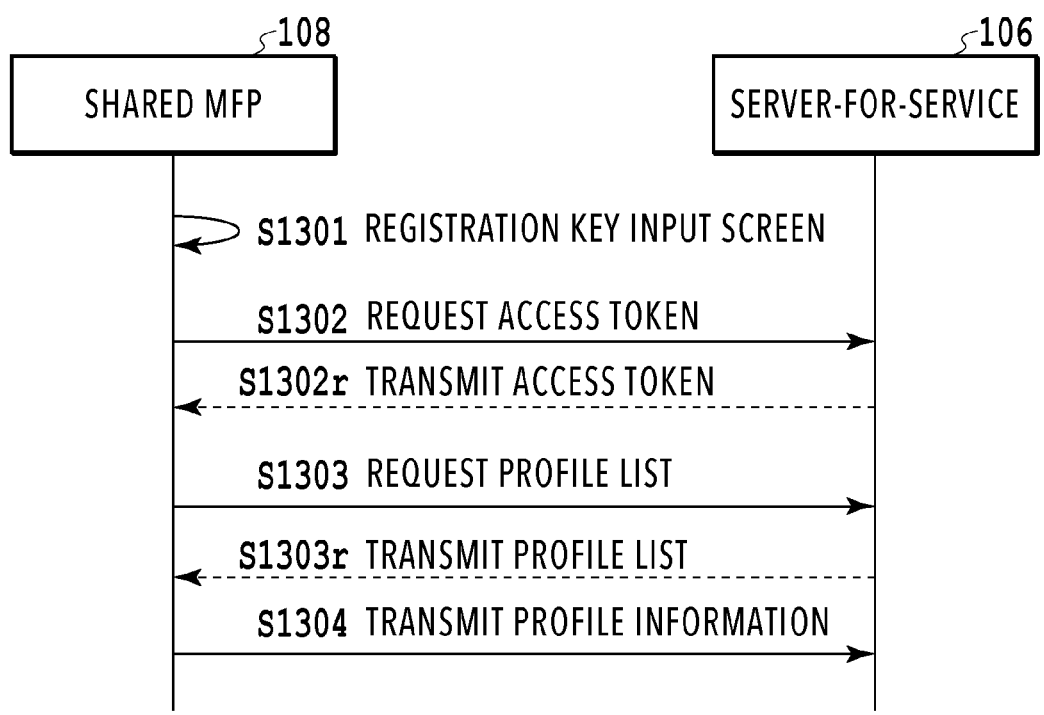
FIG. 18 is a diagram indicating steps of designating a profile from the shared MFP.

FIG. 18 is a diagram describing the steps of transmission and reception performed between the shared MFP 108 and the server-for-service 106 in a case where the user designates a desired profile execution application in the shared MFP 108. FIG. 18 is comparable to FIG. 15 in a case of using the individual MFP 102.

Here, the step executed by the shared MFP 108 is performed with the CPU 205 of the shared MFP 108 operating the application 214 held by the program memory 206 to control each unit (see FIG. 2). The step executed by the server-for-service 106 is performed with the CPU 301 of the server-for-service 106 controlling each unit based on the program saved in the disk device 302 (see FIG. 3).

When the user selects a profile execution application in the shared MFP 108, the shared MFP 108 displays the registration key input screen as described in FIG. 16 on the display unit 208 (S1301). Since the shared MFP 108 is expected to be used by multiple users, the input of a registration key for specifying a user is required every time when the server-for-service 106 is started to be used.

Once the input of the registration key is confirmed, the shared MFP 108 transmits the registration key to the server-for-service 106 and requests the server-for-service 106 to transmit an access token for obtaining a profile list of the server-for-service 106 associated with the registration key (S1302). The server-for-service 106 that receives the request transmits the access token to the shared MFP 108 (S1302r).

The shared MFP 108 that receives the access token uses the received access token to request the server-for-service 106 to transmit the profile list associated with the registration key (S1303). The server-for-service 106 that receives the request transmits the corresponding profile list to the shared MFP 108 (S1303r). Consequently, the shared MFP 108 can display the profile list as described in FIG. 7 on the display unit.

When the user selects an arbitrary profile, the shared MFP 108 transmits the selected profile information to the server-for-service 106 (S1304).

Here, the authorization of the user account in the server-for-service 106 is performed by using a registration key; however, the input of a registration key may be performed by mounting an IC card in which the information on the registration key is stored in advance into a not-illustrated IC card reader arranged in the shared MFP 108.

<Step of Executing Profile from Shared MFP>

Figure 19:
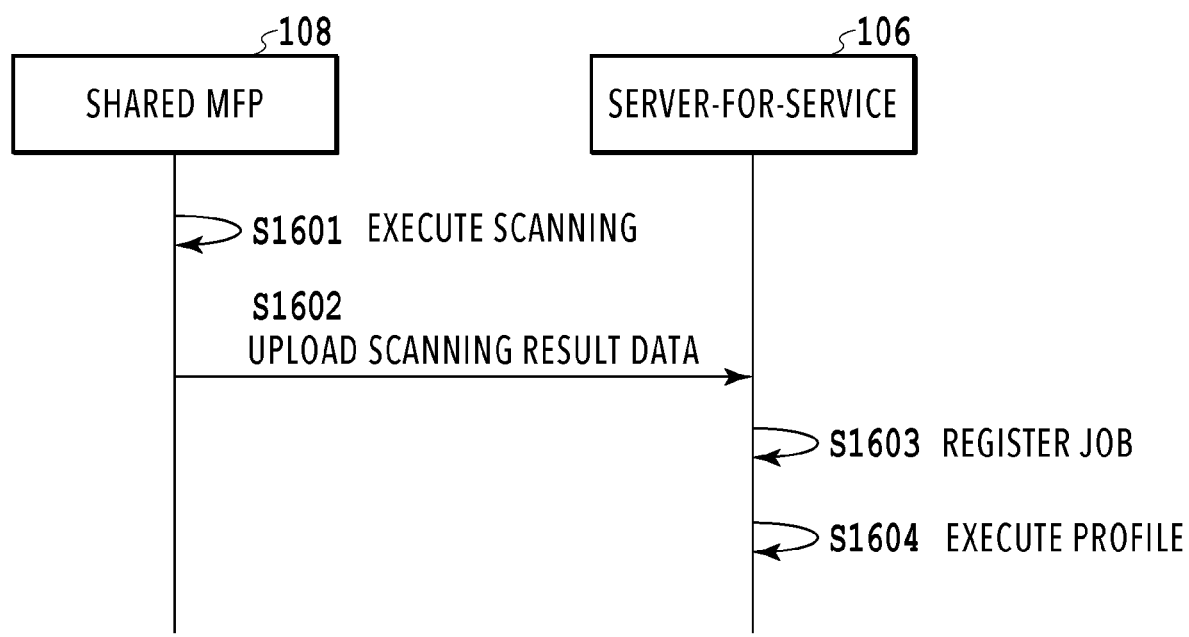
FIG. 19 is a diagram indicating steps of causing the shared MFP to execute a profile.

FIG. 19 is a diagram describing the steps of transmission and reception performed between the shared MFP 108 and the server-for-service 106 in a case where the scanning application selected in the shared MFP 108 is a profile execution application. FIG. 19 is comparable to FIG. 17 in a case of using the individual MFP 102.

Here, the step executed by the shared MFP 108 is performed with the CPU 205 of the shared MFP 108 operating the application 214 held by the program memory 206 to control each unit (see FIG. 2). The step executed by the server-for-service 106 is performed with the CPU 301 of the server-for-service 106 controlling each unit based on the program saved in the disk device 302 (see FIG. 3).

When the user instructs the execution of scanning in the shared MFP 108, the shared MFP 108 displays the scanning setting screen as described in FIG. 7. When the user instructs the scanning execution after setting the items, the shared MFP 108 uses the scanner unit 202 to execute the scanning processing in accordance with the instructed setting (S1601).

Next, the shared MFP 108 uploads the scanned data obtained from the scanning processing in S1601 with the profile selection information selected from the profile list in FIG. 7 to the server-for-service 106 (S1602). In this process, the access token obtained in S1302r in FIG. 18 is used to select the application-for-service 107 associated with the account.

The server-for-service 106 registers a pair of the received scanned data and the profile selection information in the server-for-service 106 as one job in association with the user account (S1603). Then, processing on the scanned data in accordance with the profile is performed (S1604). The processing in accordance with the profile may be performed later in a timing in which the user instructs the execution of the job on the job management screen described in FIG. 14.

A web browser similar to that of the individual MFP 102 may also be mounted in the shared MFP 108 shared by multiple users such that the shared MFP 108 is configured to select and execute a profile or perform a part of the processing of a profile through the relay server 104.

In the descriptions so far, a profile is described to be saved in association with a user account one for one; however, this embodiment is not limited thereto. For example, a configuration in which a profile is shared by multiple users of the server-for-service 106 may be applied. In this case, in the profile execution service, a function of creating a user group including multiple users is provided, and this user group is associated with a profile. That is, a profile and multiple user accounts may be eventually saved in association with each other. Consequently, it is possible to allow a user belonging to the user group to use a profile created by another user in the same user group. Also, a function of managing a privilege of each user in the user group may be further provided such that whether each of the users can use their individual profiles can be set.

According to this embodiment described above, the user can collectively instruct the execution of the scanning processing and various services desired to be used onto the image data obtained from the scanning processing on the profile selection screen. That is, the user is able to use various services provided on a network with simple steps with no need to purposely read data saved in a storage service or to instruct the execution of an arbitrary service for the read data.

Additionally, according to this embodiment, the management function of the server-for-service 106 manages the account of the user and the various MFPs in association with each other by the registration key. Therefore, the user can easily use various services from the various MFPs without reobtaining the authorization information even when the terminal device in use (client device 101) is replaced.

OTHER EMBODIMENTS

So far, a case where various services are used onto image data obtained from the scanning processing by the individual MFP 102 and the shared MFP 108 is described as an example; however, the individual MFP 102 and the shared MFP 108 can be changed to another device having a scanner function such as a copier and a facsimile. Additionally, the above-described device may not necessarily have the scanner function. The above-described device may be a device having a camera function and a function of reading image data from a memory card mounted therein, for example. In any case, any device can be used as the image processing apparatus of the present invention as long as the device is capable of obtaining image data and connected to a network.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-191642, filed Nov. 18, 2020, which is hereby incorporated by reference wherein in its entirety.

What is claimed is:

1. A server system that communicates with an image processing apparatus through a network, wherein
the server system comprises:
a storage that stores authorization information and profiles in association with a user account, wherein a process to be performed on image data is defined as each of the profiles by a user corresponding to the user account;
an authorization unit that authorizes the image processing apparatus in a case where the authorization information input on the image processing apparatus is transmitted from the image processing apparatus;
a transmission unit that transmits a list of the profiles corresponding to the authorization information to the web browser of the authorized image processing apparatus in response to a request from the web browser of the authorized image processing apparatus;
a reception unit that receives information of one profile selected from the transmitted list of the profiles by a user of the authorized image processing apparatus; and
an execution unit that executes a process corresponding to the selected one profile onto image data outputted from the image processing apparatus.

2. The information processing system according to claim 1, wherein
the image data is obtained by scanning an original with a scanning function of the image processing apparatus.

3. The information processing system according to claim 1, wherein
in a case where the request from the image processing apparatus is processing that is executable by another server system other than the server system, the execution unit causes the other server system to execute the process corresponding to the selected one profile.

4. The information processing system according to claim 1, wherein
the stored profiles include at least one of a profile defining processing of saving the image data, a profile defining processing of performing OCR on the image data, and a profile defining processing of transmitting the image data by an e-mail.

5. The information processing system according to claim 1, wherein
the image processing apparatus communicates with the server system through a relay server.

6. The information processing system according to claim 5, wherein
an application-for-browsing is mounted in the relay server, and the image processing apparatus uses the application-for-browsing to display information on the server system.

7. The information processing system according to claim 1, wherein
in response to a request from a terminal of the user, the server system issues the authorization information to the terminal device and stores the authorization information in the storage.

8. The information processing system according to claim 1, wherein
the stored profiles are created in accordance with an instruction from a terminal of the user.

9. The information processing system according to claim 1, wherein
the server system further comprises a management unit managing a job to perform the process corresponding to the selected one profile on the image data, and
the execution unit executes the job managed by the management unit in response to an instruction from a terminal.

10. The information processing system according to claim 1, wherein
the image processing apparatus is a multifunction peripheral having a scanning function and a printing function.

11. The information processing system according to claim 1, wherein
the network is implemented by any one of a LAN, a WAN, a telephone line, a dedicated digital line, an ATM, a Frame Relay line, a cable television line, a wireless line for data broadcasting or any combination thereof.

12. A non-transitory computer-readable storage medium storing a program for a server system that communicates with an image processing apparatus having a web browser through a network, the server system comprising a storage that stores authorization information and profiles in association with a user account, wherein a process to be performed on image data is defined as each of the profiles by a user corresponding to the user account, and a processor that executes the program, wherein the program performs:
- authorizing the image processing apparatus in a case where the authorization information input on the image processing apparatus is transmitted from the image processing apparatus;
- transmitting a list of the profiles corresponding to the authorization information to the web browser of the authorized image processing apparatus in response to a request from the web browser of the authorized image processing apparatus;
- receiving information of one profile selected from the transmitted list of the profiles by a user of the authorized image processing apparatus; and
- executing process corresponding to the selected one profile onto image data outputted from the image processing apparatus.

* * * * *